3,035,075
ORGANOMETALLIC COMPOUNDS AND PROCESS FOR PRODUCING SAME

William M. Sweeney, Hopewell Junction, N.Y., assignor to Texaco Inc., a corporation of Delaware
No Drawing. Filed July 18, 1955, Ser. No. 522,867
15 Claims. (Cl. 260—439)

This invention relates to novel organometallic compounds and to their preparation.

Heretofore it has been proposed to blend ferrocene, i.e., biscyclopentadienyliron, with liquid hydrocarbon fuels to obtain smoke repression and/or improved antiknock performance. Many other uses for such compounds and other similar dicyclopentadienyl metal compounds such as the cobalt, titanium, and manganese counterparts of ferrocene have been suggested, e.g., as anti-oxidants, as catalysts for reactions such as those involving carbon monoxide, as a source of free radicals, and as organic carriers of the particular metal. The solubility of ferrocene and such other metal counterparts thereof in liquid hydrocarbons is quite limited, e.g., ferrocene is soluble at 30° C. only to the extent of 4.2 weight percent in a motor naphtha base stock having A.P.I. gravity of 58.5°, boiling initially at 101° F. and being 90% evaporated at 347° F.; and only to the extent of 3.1 weight percent in a diesel fuel base stock characterized by an A.P.I. gravity between 34° and 38° and an A.S.T.M. distillation I.B.P. of 350° F. with 90% over at 600–650° F.

To increase the solubility of such organic metal carriers in hydrocarbons and in other organic solvents it has been proposed to alkylate the dicyclopentadienyl nuclei, a process which can be expensive or detrimental to quality and yield of the resulting more greatly oil-soluble product.

I have now discovered that a variety of new lipophilic organometallic compounds, characterized by a substituted two-carbon atom bridge between a pair of cyclopentadienyl rings, can be prepared readily by the process which comprises reacting a transition element salt with the alkali metal fulvene dimer at temperatures from about 100° C. to about minus 30° C., preferably at about 30–50° C., in a liquid medium inert to the elemental alkali metal under reaction conditions.

Representative compounds of this type which I have prepared are 2,3-dimethyl-2,3-bis(1'-cyclopentadienyl)-iron-butane,

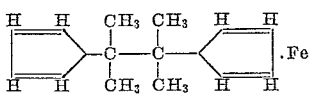

and 2,3-diethylaminomethyl-2,3-bis(1'-cyclopentadienyl)-iron-butane,

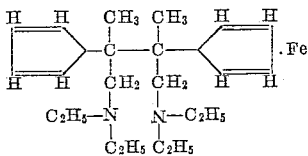

Liquid media suitable for carrying out this reaction are the indifferent solvents, preferably diethyl ether, but also suitably hydrocarbons such as xylene, petroleum naphthas (e.g. petroleum ether), higher aliphatic ethers and anisole. The reacting mixture should be protected from moisture, from the presence of carbon oxides, and from other materials tending to react with alkali metals, suitably by blanketing the reaction mixture with dry nitrogen. Operation at about room temperature is efficacious and is preferred.

Alkali metal fulvene dimers for use in the reaction can be prepared by reacting an equimolar quantity of elemental alkali metal, preferably sodium for efficiency and economy, and a dimerizable fulvene, e.g. according to the method of Schlenk and Bergmann described in their article in Leibigs Annalen Der Chemie, 479, pages 42–89 (1930). Equation 1, below, shows the reaction to make a typical dimer using dimethyl fulvene and elemental sodium. The omega carbon atom herein referred to is shown as $=C<$ in the graphic representation of the fulvene structure.

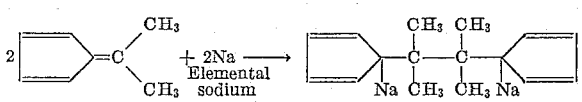

Dimethyl fulvene            Dimethyl fulvene dimer

The nuclei of such fulvenes have cyclopentadienyl structure, i.e., they have the basic carbon skeleton of cyclopentadiene,

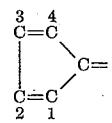

with valences of the carbon atoms numbered 1, 2, 3, and 4, above, satisfied preferably by hydrogen atoms; but it is evident to one skilled in the art that one or more of such hydrogen atoms can be replaced by an organic radical inert towards the action of elemental alkali metal, e.g., alkyl, aryl, alkaryl, aralkyl, triphenyl silicon, alkoxy, ether, thioether, tertiary amino, tertiary phosphite, tertiary phosphine, or alkenyl radicals wherein the carbon-to-carbon double bond is not conjugated with those of the fulvene base structure, for example 3-pentenyl. Other suitable nuclear substitution can consist of a single benzo nucleus fused to the cyclopentadienyl structure (making an indenyl ring material),

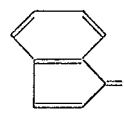

but the fluorenyl ring structure,

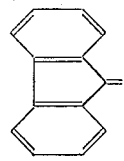

of two benzo nuclei fused to the cyclopentadienyl structure does not lend itself to formation of the new transition element organic compounds of my invention.

On the other hand fulvenes containing substituent groups with active hydrogen atoms such as the carboxyl, keto, aldehyde, secondary amino, and secondary phosphite radicals, or the chlorine, bromine, and iodine atoms, all of which can react with sodium metal, are unsuitable for preparing the organometallic compounds of my invention and so are to be avoided.

The omega carbon atom of fulvenes suitable for dimerizing is monosubstituted (is bonded directly to both a hydrogen atom and a suitable monovalent organic radical described hereinafter), or disubstituted (is bonded to no hydrogen atom but rather to a suitable divalent organic radical or to a pair of suitable monovalent organic radicals). The omega substituent radicals must be inert to the action of alkali metal under reaction conditions, and no more than one of such substituent radicals can have an aromatic nucleus directly attached to the omega carbon atom of the fulvene, i.e., aryl such as phenyl or alkaryl such as tolyl. Such restriction does not apply to aralkyl radicals such as benzyl or 3-phenyl propyl. Hence, for convenience herein, aryl and alkaryl radicals will be defined as "aromatic," whereas an aralkyl radical will be excluded from such definition.

Suitable organic radicals for the omega substitution can be alkyl; alkenyl, wherein the carbon-to-carbon double bond is not conjugated with the rest of the fulvene molecule but rather is displaced by at least one methylene group from the end of the radical joined to the omega carbon atom; aryl (not more than one of such radicals as, for example, phenyl); an alkaryl (not more than one of such radicals as, for example, tolyl); aralkyl, for example, 3-phenylpropyl; cycloalkyl, e.g. cyclohexyl; tertiary amino; tertiary phosphite; tertiary phosphine; alkoxy (and counterpart radicals wherein sulphur replaces oxygen); ether; and thioether. Alternately, it is possible to have the omega carbon atom disubstituted by a divalent cyclic structure, e.g. the omega carbon atom constituting part of an otherwise cycloalkyl-constituted ring such as would be obtained by condensing cyclohexenone with cyclopentadiene in the medium of alcoholic potash to form the fulvene

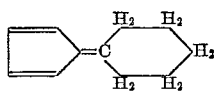

It is evident also to one skilled in the art that one or more hydrogen atoms of the substituent radicals on the omega carbon atom of the fulvene can be replaced by other organic groupings inert to elemental alkali metal under reaction conditions as described hereinbefore with respect to hydrogen replacement on the cyclic nucleus of the fulvene.

Preferably, for efficiency and economy in the practice of my process, the omega carbon atom of the fulvene is disubstituted by a pair of saturated aliphatic radicals inert to elemental alkali metal under reaction conditions, particularly by a pair of lower alkyl radicals of 1–8 carbon atoms, or by one of such lower alkyl radicals and a tertiary amino radical wherein the hydrocarbon substituent groups attached to the nitrogen atom have 1–8 carbon atoms. Exemplary fulvenes of the preferred type are omega dimethyl fulvene

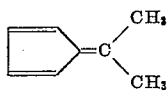

omega diethylaminomethyl omega methyl fulvene,

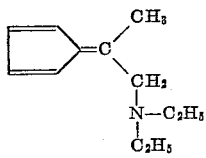

omega methyl omega ethyl fulvene,

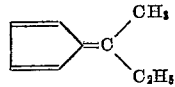

and omega diethyl fulvene,

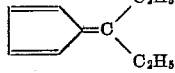

Salts of many polyvalent metals of groups IV–VIII of the periodic table combine readily with the subject fulvene dimers to replace the alkali metal atoms and thereby make a wide variety of polyvalent metal carriers. Such carriers are readily miscible in substantial concentration with hydrocarbon oils, naphtha, gasoline fractions and gas oils. Suitable polyvalent metal salts for such preparation contain the following metal ions (the Roman numerals pertain to oxidation state of the metal): iron II and III, chromium II, ruthenium II and III, cobalt II and III, rhodium III, iridium III, nickel II and III, manganese II, molybdenum IV and V, tungsten IV and V, titanium III and IV, zirconium IV, vanadium III and IV, niobium IV, and tantalum V. Acetylacetonates, halides, and aliphatic and aromatic carboxylic acid salts of these metals are typical salts useful for the preparation of the dicyclopentadienyl-metal compounds. Chlorides are the preferred salts for efficiency and economy in such preparation. Broadly, the metals useful in my preparation have been called "transition elements" and such term used herein will be considered synonymous with the metals listed above.

For efficiency and economy in my process, I prefer to use about stoichiometric proportions of dimer and of transition element salt, i.e. a mol of the alkali metal fulvene dimer per mol of transition element halide, preferably an iron chloride, plus such additional dimer as is necessary for reducing reducible materials in the reaction mixture, e.g., ferric to ferrous iron. Preferably, also, the dimer compound is not isolated from the liquid vehicle in which it was made, but rather a solution of the dimer is mixed with a solution or suspension of the desired transition element salt to form the novel biscyclopentadienyl-metal compounds of my invention. In this operation atmospheric pressure is preferred, but higher or lower pressures can be used if desired.

The resulting hydrocarbon oil-soluble metal-biscyclopentadienyl compounds formed by the reaction of an alkali metal fulvene dimer with the transition element salt of a monobasic acid can be symbolized by the following typical formula:

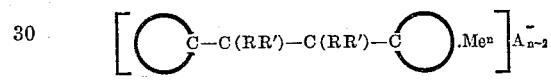

In the above formula the symbols

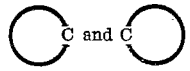

stand for a pair of like cyclopentadienyl structures described hereinbefore in connection with dimerizable fulvene. The two groups denoted by the symbol (RR'), above, correspond to those appended to the omega carbon atom of the parent dimerizable fulvene described hereinbefore, each of said groups containing not more than one aromatic radical in order that dimerization can occur. The constituents R and R' of said groups symbolize the hydrogen atom and a monovalent organic radical, or a pair of organic radicals, or a single divalent organic radical, said organic radicals being inert to elemental alkali metal. Me stands for a transition element atom; A$^-$ for a monovalent anion of the transition element salt furnishing the transition element atom for the compound; and $n$ for an integer from 2 to 5 indicating the oxidation state of the transition element atom.

The cyclopentadienyl nuclei and the radicals R and R' can be substituted so as to remain inert to elemental alkali metal as hereinbefore described in connection with the useful parent fulvene compounds. Accordingly, the (RR') groups of my preferred metal-biscyclopentadienyl compounds are constituted of two lower alkyl radicals of 1–8 carbon atoms or one such lower alkyl radical and a tertiary amino radical wherein the substituents attached to the nitrogen atom have 1–8 carbon atoms, e.g., 1,1,2,2-tetraalkyl - 1,2 - bis(1'-cyclopentadienyl)iron-ethane and 1,2-dialkyl-1,2-tertiary amino-1,2-bis(1'-cyclopentadienyl) iron-ethane.

Obviously, in the case of a transition element having oxidation state of two, e.g., ferrous iron, there is no residual valence to satisfy on the metal and thus no anion moiety in the compound; on the other hand, e.g., with titanium IV the metal will have residual valence of two to satisfy, for example with a pair of chlorine atoms or other anions resistant to reduction in the preparation of the metal organic compound.

Any residual valence of the transition element atom can, of course, be satisfied in these metal-organic compounds by means of polyvalent anions, e.g., the carbonate phthalate, maleate, or phosphate anion. Thus, my novel metal-organic compounds can be typified broadly by the formula:

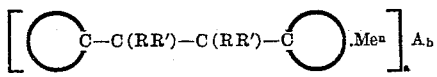

wherein: the anion moiety, A, is non-existent (subscript $b$ being zero and subscript $a$ being unity) when the oxidation state, $n$, of the transition element equals 2; and when the oxidation state, $n$, of the transition element atom is greater than 2, the subscripts $a$ and $b$ are the smallest integers which serve to balance the residual valence of the transition element with the valence of the particular anion present in the compound. The other symbols in the above broad formula correspond to those used in the typical formula hereinbefore described. The compounds covered by the above formula when A is non-existent and $Me^n$ is $Fe^{++}$ can be described as 1,1'-(vicinal alkylidene) ferrocenes.

Accordingly, the formulae below typify the resulting metal-organic compounds with divalent anions, indicated by the symbol A$=$, and oxidation state of the transition element atom above 2, indicated by superscript Roman numerals:

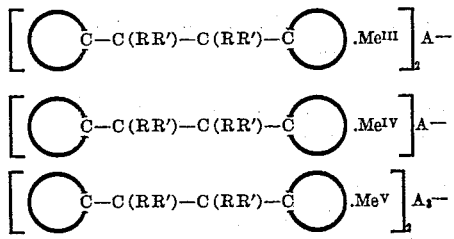

and in the corresponding case wherein the anion is trivalent (indicated by the symbol A$\equiv$) the following formulae typify the resulting compound

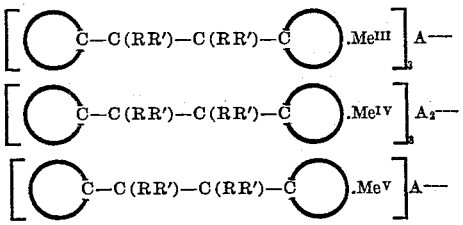

The following examples show ways in which my invention has been carried out, but are not to be construed as limiting the invention.

*Example 1.*—A solution of one mol of dimethyl fulvene,

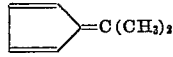

in 9.6 mols of diethyl ether was added to one mol of sodium metal in 4.8 mols of diethyl ether, thereby forming the corresponding alkali metal fulvenyl dimer. Then 0.33 mol of anhydrous ferric chloride dissolved in 4.81 mols of diethyl ether was added rapidly. The mixture was refluxed ½ hour, filtered, the precipitate washed with benzene, and the combined filtrates stripped of solvent. The stripped mixture was fractionally distilled under reduced pressure to yield a red-brown liquid product boiling at 160–170° C. under 20 mm. Hg pressure. This product had refractive index $$\frac{(20)}{(D)}$$

of 1.5560 and density $$\frac{(20°\ C.)}{(4°\ C.)}$$

of 1.1277. Calculated molecular weight of the compound 2,3 dimethyl-2,3-bis(1'cyclopentadienyl)iron-butane,

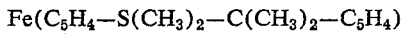

is 268 and the calculated analysis therefor in weight percent is 20.8 iron, 71.7 carbon and 7.5 hydrogen. Tests on the product compared favorably with these values, namely: molecular weight determined on the product was 252; and its analysis in weight percent was 19.75 iron, 72.8 carbon, and 8.4 hydrogen. The product was soluble to the extent of more than 8% by weight in petroleum ether and in heavier petroleum oils, but insoluble in water.

At one quarter of one percent by weight concentration of the product in a diesel fuel base stock the smoke point of the so-treated fuel was 28 mm. as determined by the Institute of Petroleum Method I.P. 57/52, whereas the smoke point of the same fuel untreated was only 17 mm. The diesel fuel base stock was characterized by A.P.I. gravity between 32° and 42° and A.S.T.M. distillation of 10% over at 480–490° F., 90% over at 580–600° F. and end point of 620–650° F. In a motor naphtha base stock five grams per gallon concentration of the product raised the octane rating from 84 (C.F.R.R. method) on the untreated stock to 86.7 (C.F.R.R. method) on the so-treated stock. The motor naphtha base stock was characterized by A.P.I. gravity of 56.1° and A.S.T.M. distillation range of 108–380° F.

*Example 2.*—Diethylaminopropanone-2 was prepared by refluxing bromoacetone and diethylamine in diethyl ether. The aminoketone was stripped of solvent and purified by fractional distillation, and the purified product reacted with cyclopentadiene in a vehicle of elemental sodium dissolved in ethanol. The resulting product, omega diethylaminomethyl omega methyl fulvene,

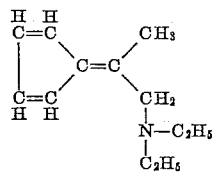

was recovered and purified for use in the synthesis to follow.

The sodium dimer of this omega-tertiary amino fulvenyl compound was prepared by adding about 0.3 mol of said fulvenyl compound dissolved in 9.6 mols of diethyl ether to 0.304 mol of sodium metal in 4.8 mols of diethyl ether. The reaction was vigorous and a red precipitate appeared as the sodium metal was being depleted.

0.1 mol of ferric chloride dissolved in 4.8 mols of diethyl ether was added to the ether solution of the above-prepared fulvene dimer. The mixture was refluxed for two hours, cooled, filtered, and the precipitate washed with 1.12 mols of benzene. Filtrates were combined and stripped of solvents, then fractionally distilled; the product distillate had boiling point of 140–160° C. at 0.5 mm. Hg, refractive index $$\frac{(20)}{(D)}$$

of 1.5740 and density $$\frac{(20°\ C.)}{(4°\ C.)}$$

of 1.122. The product, a red-brown liquid at room temperature was soluble to the extent of more than 10% by weight in petroleum ether and in heavier petroleum oils, and was insoluble in water but soluble without decomposition in dilute hydrochloric acid giving a red solution. Iron content of the product corresponded with the calculated iron analysis on the compound 2,3-diethylaminomethyl-2,3-bis(1'cyclopentadienyl)iron-butane,

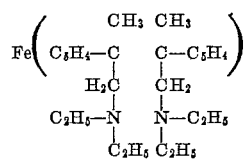

namely, 13.6 weight percent. Incorporation of this product in a fuel oil will effect smoke repression similar to that shown in the previous example.

Obviously many modifications and variations of the invention, as hereinbefore set forth, may be made without departing from the spirit and scope thereof and, therefore, only such limitations should be imposed as are indicated in the appended claims.

I claim:

1. A metal-biscyclopentadienyl compound characterized by a transition element atom in laminate complex of the ferrocene type between a pair of cyclopentadienyl structures which are also joined by a saturated two carbon atom bridge, each carbon atom of said bridge being substituted with at least one organic radical inert to elemental alkali metal, each carbon atom of said bridge having at most one aromatic substituent radical, the balance of saturation of the two carbon atoms constituting said bridge being satisfied by hydrogen atoms.

2. A metal-biscyclopentadienyl compound characterized by a transition element atom in laminate complex of the ferrocene type between a pair of cyclopentadienyl structures which are also joined by a saturated two carbon atom bridge, each carbon atom of said bridge being substituted with at least one hydrocarbon radical inert to elemental alkali metal, each carbon atom of said bridge having at most one aromatic substituent radical, the balance of saturation of the two carbon atoms constituting said bridge being satisfied by hydrogen atoms.

3. A metal-biscyclopentadienyl compound characterized by a transition element atom in laminate complex of the ferrocene type between a pair of cyclopentadienyl structures which are also joined by a saturated two carbon atom bridge, each carbon atom of said bridge being substituted with at least one radical inert to elemental alkali metal and selected from the group consisting of alkyl, phenyl, and tertiary amino radicals, each carbon atom of said bridge having at most one aromatic substituent radical, the balance of saturation of the two carbon atoms constituting said bridge being satisfied by hydrogen atoms.

4. A metal-biscyclopentadienyl compound characterized by a transition element atom in laminate complex of the ferrocene type between a pair of cyclopentadienyl structures which are also joined by a saturated two carbon atom bridge, each carbon atom of said bridge being substituted with at least one alkyl radical inert to elemental alkali metal, the balance of saturation of the two carbon atoms constituting said bridge being satisfied by hydrogen atoms.

5. A metal-biscyclopentadienyl compound characterized by a transition element atom in laminate complex of the ferrocene type between a pair of cyclopentadienyl structures which are also joined by a saturated two carbon atom bridge, each carbon atom of said bridge being substituted with a tertiary amino radical inert to elemental alkali metal and an alkyl radical inert to elemental alkali metal.

6. An iron-biscyclopentadienyl compound characterized by an iron atom in laminate complex of the ferrocene type between a pair of cyclopentadienyl structures which are also joined by a saturated two carbon atom bridge, each carbon atom of said bridge being substituted with at least one hydrocarbon radical inert to elemental alkali metal, each carbon atom of said bridge having at most one aromatic substituent radical, the balance of saturation of the two carbon atoms constituting said bridge being satisfied by hydrogen atoms.

7. 1,1,2,2,-tetraalkyl-1,2-bis(1'-cyclopentadienyl)ironethane.

8. 1,2-dialkyl-1,2-tertiary amino-1,2-bis(1'cyclopentadienyl)iron-ethane.

9. 2,3-dimethyl-2,3-bis(1'cyclopentadienyl)iron-butane.

10. 2,3-diethylaminomethyl-2,3-bis(1'cyclopentadienyl)iron-butane.

11. A process for producing a lipophilic dicyclopentadienyl-metal compound characterized by a transition element atom in laminate complex of the ferrocene type between a pair of cyclopentadienyl structures also joined by a substituted two-carbon atom bridge which comprises reacting a transition element salt of a monobasic acid with an alkali metal fulvene dimer at a temperature from about 100° C. to about minus 30° C. in a liquid medium inert to elemental alkali metals under reaction conditions.

12. The process of claim 11 wherein said fulvene dimer is a sodium dimer of an omega-dialkyl fulvene, these omega alkyl groups being lower alkyl groups.

13. The process of claim 11 wherein said fulvene dimer is a sodium dimer of an omega-lower alkyl, omega-tertiary amino fulvene.

14. The process of claim 11 wherein said transition element salt is a chloride of iron.

15. A process for the preparation of a 1,1'-(vicinal alkylidene) ferrocene which comprises reacting an iron halide with an alkali metal fulvene dimer at a temperature below about 50° C. in a liquid medium inert to elemental alkali metal under reaction conditions.

References Cited in the file of this patent

Liebig's Annalen der Chemie, vol. 479 (1930), page 46.
Rosenblum: Thesis—Harvard Univ., deposited for use in Harvard Library, February 19, 1954, page 87.
Chemistry and Industry, March 13, 1954, page 307.